United States Patent [19]

Hani et al.

[11] Patent Number: 5,334,424
[45] Date of Patent: Aug. 2, 1994

[54] THERMOPLASTIC NORBORNENE RESIN FORMED ARTICLES AND SUSTRATES FOR LIQUID CRYSTAL DISPLAY

[75] Inventors: Tsutomu Hani; Nobukazu Takahashi, both of Yokohama; Teiji Kohara, Kawasaki; Tadao Natsuume, Yokosuka, all of Japan

[73] Assignee: Nippon Zeon Co., Ltd., Tokyo, Japan

[21] Appl. No.: 950,152

[22] Filed: Sep. 24, 1992

[51] Int. Cl.$^5$ .............................................. C09K 19/00
[52] U.S. Cl. ........................................ 428/1; 428/141; 428/220; 428/500; 428/694 SG
[58] Field of Search ................... 428/141, 694 SG, 1, 428/220; 525/185

[56] References Cited

FOREIGN PATENT DOCUMENTS 445755 9/1991 European Pat. Off. .

OTHER PUBLICATIONS

Abstract of JP-A-61-115912.
Abstract of JP-A-61-120816.
Abstract of JP-A-3-14882.
Abstract of JP-A-3-122137.
Abstract of JP-A-4-63807.
Abstract of JP-A-2-227424.
Abstract of JP-A-2-276842.
Abstract of U.S. Pat. No. 4,614,778.
Abstract of JP-A-60-26024.
Abstract of JP-A-64-24826.
Abstract of JP-A-60-168708.

*Primary Examiner*—Edith Buffalow
*Attorney, Agent, or Firm*—Armstrong, Westerman, Hattori, McLeland & Naughton

[57] ABSTRACT

A thermoplastic norbornene based molded article which can be used as a substrate for liquid crystal display having an excellent performance; said substrate having a specified surface roughness of 0.05 μm or less, and a liquid crystal display produced therefrom.

13 Claims, No Drawings

THERMOPLASTIC NORBORNENE RESIN FORMED ARTICLES AND SUSTRATES FOR LIQUID CRYSTAL DISPLAY

BACKGROUND OF THE INVENTION

1. Field of the Invention

The present invention relates to thermoplastic norbornene resin formed articles and substrates for liquid crystal display.

2. Prior Art

Optical parts such as lenses and prisms, information recording medium optical devices such as optical disks, information display medium devices such as liquid crystal displays, and image pickup devices such as CCD have had problems of undesirable light refraction and irregular reflection occurring when the smoothness of their surfaces is poor. Further, to improve the accuracy of input-output of information effected by means of light, it is necessary that the devices have low birefringence or they have low degree of fluctuation of birefringence in the surface. Since birefringence is greatly affected by the unevenness of the surface, good surface smoothness is required also in this regard. Furthermore, optical parts and substrates for optical device preferably have good heat resistance and moisture resistance in consideration of the environment in which they are used.

Previously, the material which has been mainly used in optical parts and substrates for optical device is glass. However, glass is apt to be broken when it is thin, and tends to be too heavy when the thickness is increased. Further, since it is lacking in flexibility, it can hardly be used as a substrate for liquid crystal display having a curved surface. Accordingly, optical resin materials which are highly transparent and free from such disadvantages have come to be used. Such optical resin materials mainly in use are polymethyl methacrylate (PMMA) and polycarbonate (PC). However, PC shows a high birefringence (e.i., a high retardation value), while PMMA shows high water absorption and insufficient heat resistance, so that it is becoming difficult for these resins to meet the demand for increasingly higher quality products.

Recently, thermoplastic saturated norbornene resins, such as hydrogenation products of ring-opening pollers of norbornene group monomers and addition polymers of norbornene group monomers with ethylene, are attracting attention as materials for forming optical parts and substrates for optical device (Japanese Patent Kokai (Laid-open) Nos. 60-26024, 64-24826, 60-168708, 61-115912, 61-120816, and others). Thermoplastic saturated norbornene resins are excellent in transparency, show low birefringence, and also are excellent in heat resistance, moisture resistance, water resistance, electric resistance, solvent resistance, and resistance to chemicals such as acids and alkalis. Further, as compared with glass, they have good strength for their weight and have flexibility. For use in substrates for liquid crystal for example, however, the resins are unsatisfactory in surface smoothness, and the refraction due to surface unevenness will cause the distortion of images. Thus, a high level of surface smoothness of formed articles has come to be required depending on intended uses.

It is true that formed articles having a high level of surface smoothness could be obtained half by chance so long as a surface of very narrow, restricted area was concerned. However, formed articles having a high level of surface smoothness over an extent which can enclose, for example, a circle of 1 cm diameter have not been known in the prior art.

SUMMARY OF THE INVENTION

According to the present invention, there are provided thermoplastic norbornene resin formed articles and substrates for liquid crystal display which are excellent in transparency, heat resistance, moisture resistance, water resistance, resistance to chemicals such as acids and alkalis, processability, strength relative to weight, and flexibility and are low in retardation.

The present inventors have made extensive study to overcome the problems of the prior art mentioned above. As the result, it has been found that the above-mentioned object can be attained by smoothing the surface of thermoplastic saturated norbornene resin formed articles by polishing or like means to use the resulting products as substrates for liquid crystal display and the like.

DETAILED DESCRIPTION OF PREFERRED EMBODIMENT

Thermoplastic saturated norbornene resin

The thermoplastic saturated norbornene resins referred to in the present invention are known resins disclosed, for example, in Japanese Patent Kokai (Laid-open) Nos. 3-14882, 3-122137 and 4-63807. Specific examples thereof include ring-opening polymers of norbornene group monomers specified below, the hydrogenation products thereof, addition pollers of norbornene group monomers, and addition polymers of norbornene group monomers with olefins.

Norbornene group monomers referred to in the present invention also are known monomers disclosed, for example, in the above-mentioned patent specifications and Japanese Patent Kokai (Laid-open) Nos. 2-227424 and 2-276842. Specific examples thereof include norbornene, alkyl, alkylidene or aromatic group substituted derivatives thereof, substitution products of these substituted or unsubstituted olefins with polar groups such as halogen, hydroxyl group, ester group, alkoxy group, cyano group, amido group, imido group and silyl group, for example 2-norbornene, 5-methyl-2-norbornene, 5,5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene and 5-phenyl-5-methyl-2-norbornene; monomers formed by addition of one or more cyclopentadiene molecules to one norbornene molecule, the derivatives and the substitution products thereof similar to those mentioned above, for example, 1,4:5,8-dimethano-1,2,3,4,4a,5,8,8a-2,3-cyclopentadienonaphthalene, 6-methyl-1, 4:5,8-dimethano-1,4,4,5,6,7,8,8a-octahydronaphthalene, and 1,4:5,10:6,9-trimethano-1,2,3,4,4a,5,5a,6,9,9a,10, 10a-dodecahydro-2,3-cyclopentadienoanthracene; monomers of polycyclic structure which are the oligomers of cyclopentadiene, the derivatives and the substitution products thereof similar to those mentioned above, for example, dicyclopentadiene and 2,3-dihydrocyclopentadiene; addition products of cyclopentadiene with tetrahydroindene and the like, and the derivatives and the substitution products thereof similar to those mentioned above, for example, 1,4-methano-1,4,4a,4b,5,8,8a,9a- octahydrofluorene and 5,8-methano-1,2,3,4,4a,5,8,8a-octahydro-2,3-cyclopentadienonaphthalene.

The norbornene group monomers may be polymerized by conventional methods. The resulting polymers may be, if necessary and desired, hydrogenated to give thermoplastic norbornene resin hydrogenation products.

When the norbornene group monomers are subjected to ring-opening polymerization by conventional methods in the present invention, other cycloolefins capable of ring-opening polymerization may be used together within limits not substantially deleterious to the effect of the present invention. Specific examples of such cycloolefins include compounds having at least one reactive double bond, such as cyclopentene, cyclooctene and 5,6-dihydrodicyclopentadiene.

The thermoplastic saturated norbornene resin used in the present invention has a number average molecular weight of 10,000–200,000, preferably 20,000–150,000, more preferably 25,000–120,000, as determined by gel permeation chromatography (GPC) in toluene solvent. When the number average molecular weight is too low the resin is poor in mechanical strength. When it is too high the resin is poor in processability.

When the ring-opening polymer of the norbornene group monomer is hydrogenated, the rate of hydrogenation is to be at least 90%, preferably at least 95%, more preferably at least 99%, from the viewpoint of resistances to heat degradation and photodegradation.

For use in substrates for liquid crystal display, those resins are preferred which have good water resistance and moisture resistance as set forth below. When resins of particularly good water resistance and moisture resistance are necessary, thermoplastic saturated norbornene resins having no polar groups are preferred.

Additives

The thermoplastic saturated norbornene resin used in the present invention may be incorporated, as desired, with various additives, for example, phenol type or phosphor-containing antioxidants, antistatic agents, ultraviolet absorbers, etc. Since a liquid crystal tends to be deteriorate by ultraviolet rays, it is preferably incorporated with an ultraviolet absorber. Examples of ultraviolet absorbers which can be used include those of benzophenone type, benzotriazole type, and acrylonitrile type. The amount of the ultraviolet absorber to be incorporated is usually 10–100,000 ppm, preferably 100–10,000 ppm. When the resin is formed into a sheet by solution casting, it is preferably incorporated with a leveling agent to decrease surface roughness. Examples of leveling agents which may be used include leveling agents for coating materials, for example, fluorine-containing nonionic surface active agents, special acrylic resin based leveling agents and silicone based leveling agent, particularly preferred among them being those which have good compatibility with the solvent. The amount of leveling agents to be incorporated is usually 5–50,000 ppm, preferably 10–20,000 pm.

Processing

The thermoplastic saturated norbornene resin used in the present invention can be formed by conventional methods into optical parts, substrates for optical device, and the like. Various methods of forming used for conventional resins may be employed for the forming, including injection molding, extrusion, compression molding and solution casting.

When the formed article is to be used as a substrate for liquid crystal display, the resin is formed into a sheet having a thickness of 2 mm to 10 μm, preferably 1.5 mm to 20 μm, more preferably 1 mm to 50 μm.

When a liquid crystal substrate is poor in thickness uniformity or poor in surface smoothness, difficulties arise such that the image of liquid crystal display is heavily distorted and the image can be hardly discriminated. Accordingly, the substrate preferably has a thickness unevenness of ±25 μm or less through the entire surface of its smooth face and $R_{max}$ value of 0.1 μm or less, more preferably has a thickness unevenness of ±20 μm or less through the entire surface of its smooth face and $R_{max}$ value of 0.08 μm or less. A suitable method of forming for obtaining a substrate of small surface unevenness is, for example, an injection molding method which uses a thoroughly polished die.

To obtain an accurate image of high precision, the smaller are the thickness unevenness and the $R_{max}$ value, the better; substrates for liquid crystal display are required which have a thickness unevenness of ±10 μm or less, preferably ±5 μm or less, more preferably ±2 μm or less through the entire surface of their smooth face and an $R_{max}$ value of 0.07 μm or less, preferably 0.05 μm or less, more preferably 0.03 μm or less. However, even an injection molding that uses a die which has been thoroughly polished and then made more smooth by plating with chromium or the like can hardly give a substrate for liquid crystal display of an $R_{max}$ value of 0.06 μm or less.

A sheet having a surface of an $R_{max}$ value of 0.05 μm or less can be obtained by further polishing the sheet after forming it.

The polishing may be conducted by conventional methods used in polishing the plane of a thermosetting resin, which include, for example, lapping with free abrasive grains, polishing with the same, finishing with abrasive cloth or paper, mirror machining, and barrel finishing, particularly preferred among them being polishing with free abrasive grains. When the surface of a formed article before polishing has a high maximum height, it is preferably polished to a certain extent by lapping with free abrasive grains and then finished by polishing with free abrasive grains. The free abrasive grains preferably used are those of alumina, silicon carbide, silica and the like which have particle diameters of preferably 0.1–20 μm, more preferably 0.5–10 μm. When the particle diameter is too small the polishing efficiency tends to be poor. When the particle diameter is large, the maximum height of the polished surface tends to be high.

Thus, thermoplastic saturated norbornene resin formed articles are obtained whose surface has a high level of smoothness over at least an extent which can enclose a circle of a diameter of 1 cm, preferably 3 cm, more preferably 10 cm or more, particularly preferably 12 cm or more.

Substrate for liquid crystals display

The substrate for liquid crystal display according to the present invention is basically a sheet of the thermoplastic saturated norbornene resin. Since the substrate is excellent in surface smoothness, it gives images of a low degree of distortion. Further, since the substrate for liquid crystal display of the present invention is excellent in transparency, it gives images with clear distinction between light and shade. Moreover, since it has a low photoelastic modulus, it is optically uniform and can be bent for use in a curved surface liquid crystal display. The lower is the photoelastic modulus of the sheet, the better. Preferably used is a sheet having a photoelastic modulus of $9 \times 10^{-13}$ cm²/dyne, particularly $7 \times 10^{-13}$ cm²/dyne.

The substrate for liquid crystal display according to the present invention has a retardation value, which is an index expressing the magnitude of birefringence, of preferably 5 nm or less, more preferably 2 nm or less in terms of absolute value. A high absolute value of retardation is unpreferable because it causes the movement of display image depending on the angle of observation.

The substrate for liquid crystal display of the present invention is excellent in transparency, being capable of transmitting preferably at least 40%, more preferably at least 50% of incident light.

Furthermore, since the substrate for liquid crystal display of the present invention is a sheet of the thermoplastic saturated norbornene resin, it is excellent in moisture resistance and water resistance. Since the permeation of water through a substrate for liquid crystal display can cause the deterioration of the liquid crystal and transparent electrode layer, a sheet is preferably used which shows a moisture absorption of 0.05% or less, particularly 0.01% or less. Further, since the thermoplastic saturated norbornene resin has a low oxygen permeation rate of about 1 ml/m²·24 hr. as a sheet of 100 μm thickness, the substrate for liquid crystal display of the present invention sufficiently prevents the permeation of oxygen and causes little of deterioration of the liquid crystal due to oxygen.

Moreover, since the substrate for liquid crystal display of the present invention is formed out of the thermoplastic saturated norbornene resin, it is excellent in, heat resistance, solvent resistance, resistance to chemicals such as acids and alkalis and strength relative to weight, and are low in retardation value.

Though the substrate for liquid crystal display of the present invention is basically a sheet comprising the thermoplastic saturated norbornene resin, various films or layers may be laminated thereto in practical use according to intended uses or other factors, which include a transparent electrode layer, liquid crystal orientation layer, gas barrier film, deflector, phase film, etc. Further, a spacer may be laminated to provide a space for enclosing a liquid crystal between two substrates for liquid crystal display. For the purpose of suppressing the deterioration by oxygen permeation still further thereby to enhance durability, a gas barrier material, such as polyvinylidene chloride and polyvinyl alcohol, is preferably laminated, via an adhesive agent layer or such, between the substrate for liquid crystal display and the transparent electrode layer or on the side opposite to the face of adhesion of the substrate with the transparent electrode layer. Products comprising additionally these laminates are also sometimes referred to as substrates for liquid crystal display in the present specification.

Transparent electrode layer

A transparent electrode layer should have been laminated on a substrate for liquid crystal display at the time when the substrate is used as a component of liquid crystal display. The transparent electrode layer must have at least a certain degree of transmittance to visible light, usually at least 50%, more preferably at least 70%, and has a specific resistance of not more than 100 Ωm, preferably not more than 50 Ωcm. Specific examples of the transparent electrode layer include films of metals such as Au, Ag, Cu, Pt, Al, Cr and Pd, films of semiconductors and oxide semiconductors such as In₂O₃(Sn), SnO₂(Sb), SnO₂(Fe), CdO, Cd₂O₃, CdSnO₄, TiO₂, ZrO₂ and CuI, multilayer films such as $TiO_x$/Ag/$TiO_x$ ($x \leq z$), films of polyelectrolyte such as polyvinylbenzyltrimethylammonium chloride and oligo(or poly)styrenesulfonic acid salts and films of electroconductive polymers such as polyanilines, polythiophenes and polypyrroles. These electroconductive films may be laminated on the substrate for liquid crystal display by conventional methods, including spraying, plasma coating, chemical vapor deposition (CVD), casting (CLD), vacuum deposition, RF or DC sputtering, ion plating and electrolytic polymerization. The electroconductive polymer may also be formed in the interior of the film by means of electrolytic polymerization or gas phase polymerization. Further, electroconductivity can be imparted by impregnation with such complexes as TTD-TCNQ (tetrathiofulvalene-tetracyanoxydimethane).

Liquid crystal display

The liquid crystal display according to the present invention is basically a liquid crystal cell comprising two substrates for liquid crystal display and a liquid crystal enclosed therebetween. The liquid cell is usually constructed, to prevent the leakage of the liquid crystal, such that a frame called a spacer is inserted between two liquid crystal substrates and a liquid crystal is enclosed in the space formed by the thickness of the spacer and the surfaces of the liquid crystal substrates. The spacer is not particularly restricted so long as it is made of a material which neither reacts with the liquid crystal nor permits the permeation of oxygen and water. In the case of a curved surface liquid crystal display or the like, the spacer preferably has a certain degree of flexibility. The spacer and the substrates for liquid crystal display are usually bonded with an adhesive to prevent the leakage of the liquid crystal. The adhesive agent is not particularly restricted so long as it does not readily react with the liquid crystal and has a satisfactory adhesive property.

Further, a deflector, phase film, protective film, reflecting film, back light, and the like are combined with the liquid crystal cell according to intended uses and other necessities to form a liquid crystal display.

The present invention will be described in more detail below with reference to Referential Examples, Examples and Comparative Examples.

REFERENTIAL EXAMPLE 1

A hydrogenation product (number average molecular weight: 28,000, hydrogenation rate: nearly 100%, glass transition temperature: 152° C.) of a ringopening polymer of 6-methyl-1,4:5,8-dimethano-1,4,4a,5,6,7,8,8a-octahydronaphthalene was injection-molded with an injection molding machine (DISC-5 MIII, mfd. by Sumitomo Heavy Industries, Ltd,) at a resin temperature of 330° C. and a die temperature of 110° C. to form an optical disk substrate 130 mm in diameter and 1.2 mm in thickness.

The surface of the injection-molded article showed a maximum height, $R_{max}$, of 0.12 μm at the maximum and 0.11 μm at the minimum through the entire surface.

EXAMPLE 1

The molded article obtained in Referential Example 1 was subjected to a lapping treatment by using a Hoffman type lapping machine (DSM 20B-5L, mfd. by Speedfan Co., Ltd.) provided with a 20-inch surface table made of cast iron and using a carrier (EG Carrier, mfd. by Speedfam Co., Ltd.) as a jig, in the following manner.

The molded article of Referential Example 1 was lapped for 20 minutes while regulating the load applied onto the surface of the article at 0 05–0.10 kg/cm$^2$, regulating the rotational speed of the upper and lower surface tables at 20–50 rpm, and feeding a slurry mixture of 300 g of an abrasive (A-1200, mfd. by Speedfam Co., Ltd.) made of white alumina having an average particle diameter of 12.3 μm and 1 l of water at a rate of 600–1000 cm$^3$/min.

The lapped molded article was then subjected to polishing treatment by using a Hoffman type polishing machine (DSM 16B-4P, mfd. by Speedfam Co., Ltd.) of a surface table size of 16 inches provided with a polisher (SURFIN 018-3, mfd. by Speedfam Co., Ltd.) made of polyurethane and using a carrier (EG Carrier, mfd. by Speedfam Co., LTd.) as a jig.

The polishing was conducted for 60 minutes while regulating the load applied onto the surface of the molded article at 0.05–0.10 kg/cm$^2$, regulating the rotational speed of the upper and lower surface tables at 20–50 rpm and feeding a slurry mixture (POLIPLA 103, mfd. by Speedfam Co., Ltd.) of an abrasive made of white alumina having an average particle diameter of 1.3 μm and water in a weight ratio of 1 to 1 at a rate of 200–400 cm$^3$/min.

Resultantly, the molded article showed a maximum height, R$_{max}$, of 0.021 μm at the maximum and 0.016 μm at the minimum through the entire surface.

REFERENTIAL EXAMPLE 2

To 100 parts by weight of 6-methyl-1,4:5,8-dimethano-1,4,4a,5,6,7,8,8a-octahydronaphthalene were added as the polymerization catalyst 10 parts by weight of a 15% cyclohexane solution of triethylaluminum, 5 parts by weight of triethylamine and 10 parts by weight of a 20% cyclohexane solution of titanium tetrachloride, and the mixture was subjected to ring-opening polymerization in cyclohexane. The resulting ring-opening polymer was hydrogenated with the aid of a nickel catalyst to obtain a polymer solution. The polymer solution was coagulated in isopropyl alcohol and dried to obtain a powdery resin. The resin had a number average molecular weight of 40,000, hydrogenation rate of 99.8% or more, Tg of 142° C. and residual solvent concentration of 0.05%.

EXAMPLE 2

A resin solution was prepared by dissolving 15 parts by weight of the resin of Referential Example 2 in 85 parts by weight of chlorobenzene. Then, a leveling agent (FLUORAD FC-430, mfd. by Sumitomo 3M Limited) and an ultraviolet stabilizer (Viosorb 80, mfd. by Kyodo Seiyaku) were added to the solution so as to give a concentration of 500 ppm and 300 ppm, respectively. The solution was dropped onto a surface-polished glass plate, and cast to a width of about 300 mm and a length of about 500 mm by means of a bar coater. Then, as the first stage drying, the cast solution was transferred together with the glass plate onto a hot plate and dried at 50° C. for 30 minutes and then at 90° C. for 30 minutes. After cooled to room temperature, a part of the resulting sheet was cut out and examined for its residual solvent concentration to show a value of 2.0% by weight. Then, as the second stage drying, the sheet was dried on a hot plate at 110° C. for 30 minutes and further at 140° for 60 minutes. After cooled to room temperature the resin film was peeled off the glass plate and its periphery was cut off in 10 mm width to obtain a sheet. The sheet had a residual solvent concentration of 0.11% by weight.

The surface of the sheet was examined visually and with an optical microscope. No bubbling, streaks nor flaws were recognized. The sheet showed a Tg of 140° C., average thickness of about 100 μm, variation of thickness of ±2 μm or less at the maximum, R$_{max}$ value of 0.10 μm or less for both surfaces, light transmittance of 90.5%, and the maximum of the absolute value of retardation of 2 nm or less through the entire surface.

The sheet was subjected to a lapping treatment by using a Hoffman type lapping machine (DSM 5B-8L, mfd. by Speedfam Co., Ltd.) provided with a 5-inch surface table made of cast iron and using a carrier (EG Carrier, mfd. by Speedfam Co., Ltd.) as a jig.

The sheet was lapped for 10 minutes while regulating the load applied onto the sheet surface at 0.04–0.08 kg/cm$^2$, regulating the rotational speed of the upper and lower surface tables at 25–50 rpm, and feeding a slurry mixture of 300 g of an abrasive (A-1200, mfd. by Speedfam Co., Ltd.) made of white alumina having an average particle diameter of 2.3 μm and 1 l of water at a rate of 600–1000 cm$^3$/min.

The lapped sheet was subjected to a polishing treatment by using a Hoffman type polishing machine (DSM 5B-8P, mfd. by Speedfam Co., Ltd.) of a surface table size of 5 inches provided with a polisher (SURFIN 0.18-3, mfd. by Speedfam Co., Ltd.) made of polyurethane and using a carrier (EG Carrier, mfd. by Speedfam Co., Ltd.) as a jig.

The polishing was conducted for 40 minutes while regulating the load applied onto the sheet surface at 0.04–0.08 kg/cm$^2$, regulating the rotational speed of the upper and lower surface tables at 20–50 rpm and feeding a slurry mixture (POLIPLA 103, mfd. by Speedfam Co., Ltd.) of an abrasive made of white alumina having an average particle diameter of 1.3 μm and water in a weight ratio of 1 to 1 at a rate of 200–400 cm$^3$/min.

Resultantly, the cast article showed a maximum height, R$_{max}$, of 0.042 μm at the maximum through the entire surface.

Two regular squares 20 mm on each side were cut out of the sheet. To one surface each of the two squares was laminated a transparent electrode layer by vacuum deposition of In$_2$O$_3$(Sn), to obtain substrates for liquid crystal display.

REFERENTIAL EXAMPLE 3

A resin solution prepared by dissolving 15 parts by weight of the resin of Referential Example 1 in 85 parts by weight of xylene was cast in the same manner as in Example 2. As the first stage drying, then, the cast resin was dried together with the glass plate in an air-circulation oven at temperatures raised from 25° C. to 80° C. in the course of 30 minutes. After cooled to room temperature, a part of the sheet was cut out and examined for its residual solvent concentration to show a value of 1.6% by weight. Then, as the second stage drying, the sheet was dried in an oven at 130° C. for 90 minutes. After cooled to room temperature the resin film was peeled off the glass plate and its periphery was cut off in 10 mm width to obtain a sheet. The sheet had a residual solvent concentration of 0.04% by weight.

The surface of the sheet was examined visually and with an optical microscope. No bubbling, streaks nor flaws were recognized. The sheet showed a Tg of 141° C., average thickness of 10 μm, variation of thickness of ±0.3 μm or less at the maximum, $R_{max}$ value of 0.12 μm or less for both surfaces, and the maximum of the absolute value of retardation of 2 nm or less through the entire surface.

A regular square 20 mm on each side was cut out from the sheet. Further, a regular square part 16 mm on each side was cut out of the interior of the square sheet such that each side is 2 mm apart from the outer periphery of the larger square sheet, to obtain a spacer.

EXAMPLE 3

The spacer obtained in Referential Example 3 was laminated onto the transparent electrode layer side of one of the substrates for liquid crystal display obtained in Example 2 by coating 20 mg/cm² of a 10% by weight toluene solution of a hot melt adhesive (DH 597A, mfd. by Nogawa Chemical Co., Ltd.), followed by drying at 80° C. for 2 minutes and applying a pressure of 3 kg/cm². At this time, a lead wire was attached to the transparent electrode layer from one point 1 mm apart from the outer periphery of the substrate for liquid crystal display, toward the outside.

After the spacer had been adhered, methoxybenzylidenebutylaniline liquified at 30° C. and containing 5% by weight of glass beads of average particle diameter 10 μm dispersed therein was poured onto the substrate for liquid crystal display to serve as a liquid crystal. Then, the other substrate for liquid crystal display obtained in Example 1 was placed thereupon and adhered to the spacer by using a 10% by weight solution of DH 597A such that the transparent electrode layer of the substrate faced the liquid crystal side and that no air was left behind.

The liquid crystal cell thus obtained was kept at 30° C., and DC voltage of 1400-2400 V/cm was applied between two lead wires. With the increase in voltage, the scattering of light increased and the cell became cloudy like frosted glass. This demonstrates that the substrate for liquid crystal display of the present invention can be used for liquid crystal displays.

The substrate for liquid crystal display of the present invention, which comprises the thermoplastic saturated norbornene resin, is excellent in transparency, heat resistance, moisture resistance, strength, water resistance, electric insulation, solvent resistance, and resistance to chemicals as acids and alkalis, and are low in retardation. Further, since the substrate has a low photoelastic modulus, it is optically uniform and can be used for producing curved surface liquid crystal displays. The liquid crystal display of the present invention is lightweight, and can give images of very low distortion by enhancing the surface smoothness of the substrate for liquid crystal display.

What is claimed is:

1. A thermoplastic saturated norbornene resin formed article which has a surface wherein the surface roughness is 0.05 μmn or less in terms of the maximum height, $R_{max}$, over an extent which can enclose a circle of 1 cm or more in diameter.

2. The formed article according to claim 1 which is in the form of sheet.

3. The formed article according to claim 1 wherein the sheet has a thickness of 2 mm or less.

4. The formed article according to claim 3 wherein the sheet has a thickness of 1 mm or less.

5. The lsubstrate for liquid crystal display according to claim 4 wherein the absolute value of retardation is 2 nm or less.

6. The substrate for liquid crystal display according to claim 5 which has a transparent electroconductive layer laminated.

7. A liquid crystal display which uses the liquid crystal substrate according to claim 6.

8. The formed article according to claim 1, wherein said surface has been polished so as to have said roughness.

9. A thermoplastic saturated norbornene resin for article which has a surface wherein the surface roughness is 0.05 μm or less in terms of the maximum height, $R_{max}$, over an extent which can enclose a circle of 10 cm or more in diameter.

10. The formed article according to claim 2, wherein said surface has been polished to have said roughness.

11. A substrate for liquid crystal display comprising a thermoplastic saturated norbornene resin having a surface wherein the surface roughness is 0.05 μm or less in terms of the maximum height, $R_{max}$, over an extent which can enclose a circle of 1 cm or more in diameter.

12. The substrate for liquid crystal display according to claim 6 wherein the absolute value of retardation is 5 nm or less.

13. The substrate for liquid crystal display according to claim 6, wherein said surface has been polished to have said roughness.

* * * * *